(12) United States Patent
Cohen

(10) Patent No.: US 8,963,529 B2
(45) Date of Patent: Feb. 24, 2015

(54) TRANSITION MODE CHARGE CONTROL FOR A POWER CONVERTER

(75) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 13/096,766

(22) Filed: Apr. 28, 2011

(65) Prior Publication Data

US 2012/0275198 A1  Nov. 1, 2012

(51) Int. Cl.
*G05F 1/00*  (2006.01)
*H02M 3/335*  (2006.01)

(52) U.S. Cl.
CPC .................... *H02M 3/33507* (2013.01)
USPC ........................................ 323/285

(58) Field of Classification Search
USPC ......... 323/284, 285, 207, 287, 290, 222, 223; 363/21.12, 21.16
See application file for complete search history.

(56) References Cited

U.S. PATENT DOCUMENTS

| | | | |
|---|---|---|---|
| 4,866,592 A | 9/1989 | Fuji et al. | |
| 4,985,821 A | 1/1991 | Cohen | |
| 5,101,335 A | 3/1992 | Ludden et al. | |
| 5,430,405 A * | 7/1995 | Cohen | 327/581 |
| 5,757,635 A * | 5/1998 | Seong | 363/89 |
| 5,867,379 A * | 2/1999 | Maksimovic et al. | 363/89 |
| 6,229,725 B1 | 5/2001 | Nielsen | |
| 6,351,401 B1 | 2/2002 | Scheel et al. | |
| 7,436,685 B2 * | 10/2008 | Li et al. | 363/21.01 |
| 8,467,201 B2 * | 6/2013 | Berghegger | 363/21.08 |
| 2007/0085517 A1 * | 4/2007 | Ribarich et al. | 323/235 |
| 2009/0097280 A1 | 4/2009 | Wu et al. | |

OTHER PUBLICATIONS

Texas Instrument, Transition Mode PFC Controller, Dec. 2004, pp. 1-24.*
Wei Tang, "Charge Control: Modeling, Analysis, and Design", IEEE Transactions on Power Electronics, vol. 8, No. 4, Oct. 1993, pp. 396-403.
PCT Search Report mailed Oct. 25, 2012.

* cited by examiner

*Primary Examiner* — Adolf Berhane
*Assistant Examiner* — Afework Demisse
(74) *Attorney, Agent, or Firm* — William B. Kempler; Frederick J. Telecky, Jr.

(57) ABSTRACT

One embodiment relates to power conversion system. The system includes a converter configured to convert an input voltage to an output voltage, the converter comprising at least one switch that is controlled in response to an activation signal to provide current through an inductor. A transition mode controller is configured to provide the activation signal based on a measure of charge derived from current through the switch and based on the current through the inductor.

18 Claims, 3 Drawing Sheets

TRANSITION MODE CHARGE CONTROL FOR A POWER CONVERTER

TECHNICAL FIELD

The present invention relates generally to transition mode charge control for a power converter.

BACKGROUND

Various types of power converter topologies exist for converting electrical energy to one form or the other, such as from AC to DC, from DC to AC and DC to DC. There is an increasing demand for power conversion circuitry to operate with increased efficiency. Power converters have been implemented as an efficient mechanism for providing a regulated output in power supplies. As one example, the switching regulator (also known as a switch-mode power supply) can control the flow of power to a load by controlling the on and off duty-cycle of one or more switches coupled to an inductor.

SUMMARY

One embodiment of the present invention includes a power conversion system. The system includes a converter configured to convert an input voltage to an output voltage, the converter comprising at least one switch that is controlled in response to an activation signal to provide current through an inductor. A transition mode controller is configured to provide the activation signal based on a measure of charge derived from current through the switch and based on the current through the inductor.

Another embodiment of the present invention includes a method for regulating an output voltage. The method includes monitoring a magnitude of a current flowing through an inductor of a converter. A switch is activated to increase the magnitude of the current in response to the magnitude of the current through the inductor being approximately zero. An indication of current through the switch is integrated to derive a measure of an electric charge absorbed from an input voltage during activation of the switch. The switch is deactivated in response to the measure of the electric charge being greater than a charge reference.

Another embodiment of the present invention includes a power converter system. The system includes a switching converter configured to generate an output voltage based on activation and deactivation of a switch to provide a current through an inductor. A transition mode controller includes an integrator configured to integrate a representation of the current through the switch to provide a measure of an electric charge absorbed from an input voltage of the converter. The transition mode controller can also include switching logic configured to activate the switch in response to a zero-crossing condition of the current through the inductor and to deactivate the switch in response to the measure of electric charge exceeding a charge reference.

DETAILED DESCRIPTION

The invention relates generally to transition mode charge control of a power converter. The power conversion system can include a converter and a transition mode controller. The converter is configured to generate an output voltage and/or output current based on activating and deactivating at least one switch to provide a current flow (e.g., through an inductor). As an example, the converter can be configured as a flyback converter, a boost converter, a buck converter, or any of a variety of other types of converter topologies (e.g., the system can be considered topology agnostic).

The transition mode controller can be configured to control a switch of the switching converter based on an electric charge corresponding to a time integral of input current of the converter. For example, upon activating the switch, the transition mode controller can integrate a signal representing the input current absorbed by the converter to provide an indication of electric charge. The electric charge can be compared with a predetermined charge reference, such that upon the electric charge being greater than the predetermined charge magnitude, a latch can be reset to turn off the at least one switch through which the detected current flows. Thus, in response to the switch being deactivated, the detected current can be turned off. The transition mode controller can monitor the magnitude of the magnetic flux in the core of an inductor of the converter, such as to detect a zero-crossing of the flux. In response to detecting the zero-crossing, the transition mode controller can set the latch to activate the switch, thereby allowing restarting the current flow through the inductor. This control of the switch and current flow can operate to modulate the converter as a form of hysteretic control. Accordingly, by adjusting the charge reference the transition mode controller can control the current through the inductor to efficiently regulate the output voltage.

Figure 1:
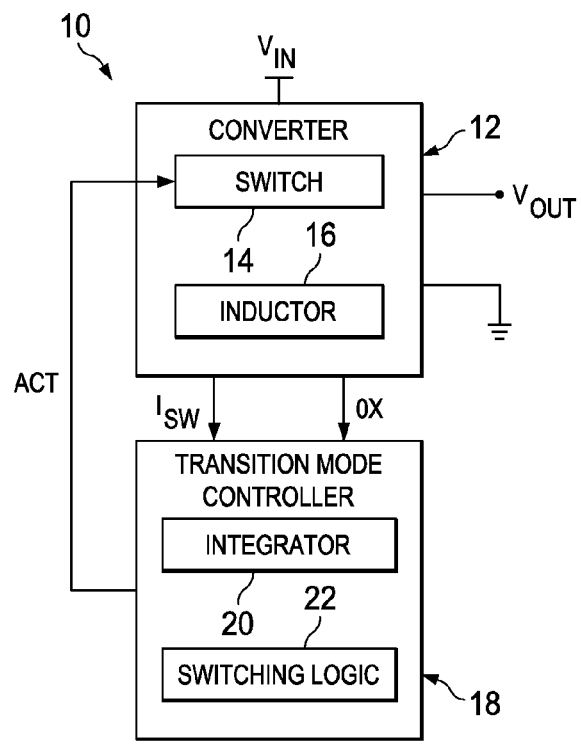
FIG. 1 illustrates an example of a power converter system in accordance with an aspect of the invention.

FIG. 1 illustrates a block diagram of an example of a power conversion system 10. The power conversion system 10 is configured to regulate an output voltage $V_{OUT}$ based on an input voltage $V_{IN}$. The power conversion system 10 can be implemented in a variety applications, such as in portable electronic devices (e.g., wireless communications devices and/or portable computer devices).

The power conversion system 10 includes a converter 12. The converter 12 can be configured as any of a variety of switching converter topologies to regulate the magnitude of the output voltage $V_{OUT}$ by controlling activating and deactivating (e.g., modulating) at least one switch 14. As an example, the at least one switch 14 can be a field effect transistor that is coupled to an inductor 16 (directly or indirectly through other circuitry) to provide a current based on the input voltage $V_{IN}$. Such current can flow through the inductor 16 of the converter 12. By controlling the current through the inductor 16, the converter can regulate the output voltage $V_{OUT}$. In this example, the current is controlled via transition mode charge control implemented by a transition mode controller 18. This control algorithm is applicable to a variety of switching converter topologies.

As an example, the switching converter 12 can be configured as a flyback converter, such that the inductor 16 is a primary inductance of a transformer. As another example, the switching converter 12 can be configured as a boost converter.

As yet another example, the switching converter 12 can be configured as a buck converter.

The transition mode controller 18 is configured to modulate the at least one switch 14, such as by generating an activation signal ACT to control the activation and deactivation of the switch 14 to regulate the output voltage $V_{OUT}$. In the example of FIG. 1, the converter 12 provides the transition mode controller 18 with a current $I_{SW}$ that is equal or proportional to the current in the inductor 16 and a current zero-crossing signal 0X that is associated with the magnetic flux in inductor 16 crossing zero. As an example, the current $I_{SW}$ can correspond to a current through the switch 14 (e.g., one or more switches). The current zero-crossing signal 0X can correspond to the current through the inductor 16 or can be related to the current through the inductor 16. For example, the current zero-crossing signal 0X can be derived from a voltage appearing across the inductor 16 or across a winding coupled to the inductor 16, such that the current zero-crossing signal 0X is generated when the voltage across the inductor 16 reverses. The transition mode controller 18 can provide the activation signal ACT to control the activation and deactivation of the at least one switch 14 in response to the current $I_{SW}$ and current zero-crossing signal 0X.

The transition mode controller 18 includes an integrator 20 configured integrate the current Isw with respect to time to provide an output corresponding to electric charge associated with the current $I_{SW}$. As an example, the integrator 20 can include a capacitor configured to charge in response to the detected current $I_{SW}$. The transition mode controller 18 also includes switching logic 22 that is configured to provide the activation signal ACT based on the current zero-crossing signal 0X and the electric charge in the integrator 20 as to modulate the switch 14 accordingly.

As an example, the switching logic 22 can control the state of the activation signal ACT to activate the at least one switch 14 to provide current flow through the inductor 16 in response to detecting a zero-crossing of the magnetic flux in the inductor 16 based on 0X. Activation of the switch 14 upon the magnetic flux crossing zero yields transition mode operation of the converter 12, i.e. operation at the boundary between a continuous conduction mode and a discontinuous conduction mode. As another example, the switching logic 22 can switch the state of the activation signal ACT to deactivate the at least one switch 14 to cease the current flow from the input source $V_{IN}$ in response to the electric charge being greater than a predetermined charge reference, which can be fixed or variable. In this way, the transition mode controller 18 can regulate the output voltage $V_{OUT}$ based on the charge associated with the current flow through the inductor 16.

Figure 2:
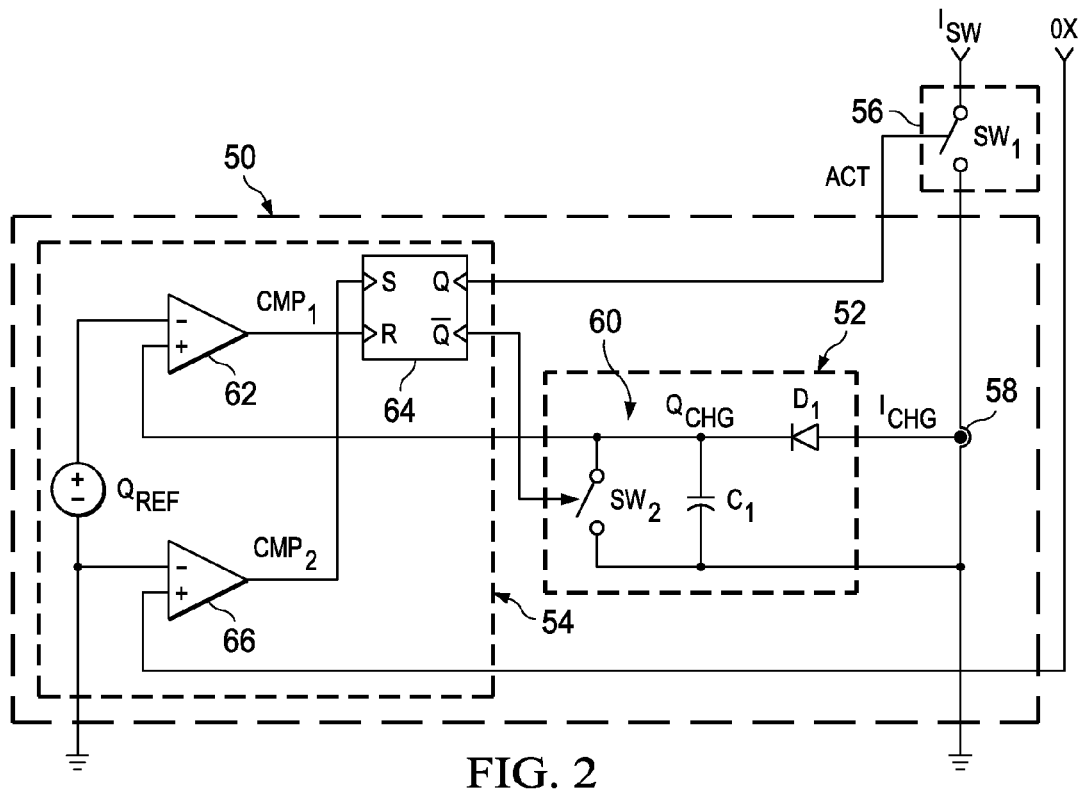
FIG. 2 illustrates an example of a transition mode controller in accordance with an aspect of the invention.

FIG. 2 illustrates an example of a transition mode controller 50 in accordance with an aspect of the invention. The transition mode controller 50 can correspond to the transition mode controller 18 in the example of FIG. 1. Therefore, reference can be made to the example of FIG. 1 for additional context in the following description of the example of FIG. 2.

The transition mode charge controller 50 includes an integrator 52 and switching logic 54, which can correspond respectively to the integrator 20 and the switching logic 22 in the example of FIG. 1. In the example of FIG. 2, the integrator 52 is configured to integrate the current in the switch 56. A current sensor 58 is configured to provide an output that is equal or proportional to the switch current $I_{SW}$. The current sensor 58 can be configured as including any of a variety of circuit components (e.g., a proportional current generator) to divert a current $I_{CHG}$ that is equal or proportional to the current $I_{SW}$. For example, the current sensor 58 can have a gain that is less than one to divert the current $I_{CHG}$ that is less than and proportional to the current $I_{SW}$ from flowing to ground. The current $I_{CHG}$ is provided as an input to the integrator 52 through a diode $D_1$. The integrator 52 can include a capacitor $C_1$ configured to integrate the current $I_{CHG}$ (during conduction of the switch 56) to develop a voltage across the capacitor $C_1$ corresponding to a charge signal $Q_{CHG}$ that is proportional to the charge absorbed from the input voltage $V_{IN}$ through conduction of the switch 56. For instance, the charge signal $Q_{CHG}$ at a node 60 can be a voltage having a magnitude proportional to the charge absorbed due to conduction of the current $I_{SW}$. The magnitude of the electric charge $Q_{CHG}$ increases over time as the current $I_{SW}$ for as long as current continues to flow in switch 56.

The switching logic 54 includes a charge comparator 62 that receives the charge signal $Q_{CHG}$ at a non-inverting input and receives a charge reference $Q_{REF}$ at an inverting input. As described herein, the charge reference $Q_{REF}$ can be a fixed predetermined reference or it can be variable depending on the desired operation of the converter. The charge comparator 62 provides an output CMP1 to a reset input of an SR-latch 64 based on comparing the charge signal $Q_{CHG}$ relative to the charge reference $Q_{REF}$. The SR-latch 64 provides the activation signal ACT at its Q output. Therefore, the charge comparator 62 thus provides a logic-low (i.e., logic 0) at its output in response to the magnitude of the electric charge $Q_{CHG}$ being greater than the charge reference $Q_{REF}$. That is, the SR-latch 64 changes the state of the activation signal ACT to deactivate the switch 56 in response to the magnitude of the charge $Q_{CHG}$ increasing greater than the charge magnitude of the predetermined electric charge $Q_{REF}$ such that the switch current $I_{SW}$ ceases.

After the value charge signal $Q_{CHG}$ exceeds the value of the charge reference $Q_{REF}$, integrator 52 is reset in preparation for the next cycle. In the example of FIG. 2, the integrator 52 can include a switch $SW_2$ arranged in parallel with the capacitor $C_1$. The switch $SW_2$ can be configured as a semiconductor switch, such as any of a variety of field-effect transistors (FETs). The switch $SW_2$ can be controlled in response to the Q' output of the latch, which corresponds to an inverted version of the ACT signal. The switch $SW_2$ can operate to reset the integrator 52 in response to the signal at Q'. As an example, in response to the magnitude of the electric charge $Q_{CHG}$ exceeding the magnitude of the predetermined electric charge $Q_{REF}$, (e.g., at approximately the same time as the current $I_{SW}$ ceases to flow), switch $SW_2$ is activated to discharge the capacitor $C_1$ to ground. Accordingly, integrator 52 is substantially reset to allow the electric charge $Q_{CHG}$ to be monitored in a next cycle after the switch $SW_1$ is closed again to provide the inductor current $I_{SW}$ to the integrator 52.

In response to the deactivation of the switch 56, the magnitude of the flux in the inductor 16 of the converter also begins to decrease as the magnetic energy stored in the inductor 16 is discharged. The switching logic 54 includes a comparator 66 that is configured to monitor the zero-crossing signal 0X, and thus to sense a zero-crossing of the inductor flux. As an example, the zero-crossing signal 0X can correspond to a voltage of a node to which the inductor 16 is coupled that reverses in polarity when the current in the inductor 16 crosses zero.

In the example of FIG. 2, the zero-crossing signal 0X is provided to a non-inverting input of the comparator 66 and ground is provided to an inverting input of the comparator 66. Therefore, the zero-crossing signal 0X can be compared by the comparator 66 with ground to detect a zero-crossing of the inductor current $I_{SW}$. It is to be understood that one or both of the inputs of the comparator 66 can be provided with an offset voltage. The comparator 66 has an output that is coupled to the set input of the SR-latch 64. Thus, when the magnitude of the zero-crossing signal 0X is approximately equal to zero, the comparator 66 changes the state of the activation signal ACT to activate the switch 56. As a result, the switch current $I_{SW}$ begins to increase again and the current is detected and integrated by the integrator 52 to provide the corresponding charge signal $Q_{CHG}$ to the comparator 62. Accordingly, the activation/deactivation cycle repeats to modulate the switch 56 to according to efficiently regulate the output voltage $V_{OUT}$.

Based on the operation of the transition mode controller 50, the power conversion system 10 in the example of FIG. 1 can self-oscillate with respect to activation and deactivation of the switch 56 at a frequency that is determined by the magnitude of the input voltage $V_{IN}$, the inductance of the inductor 16, and the magnitude of the charge reference $Q_{REF}$. During operation of the power conversion system 10, the current $I_{SW}$ can have an average that is proportional to a product of the predetermined electric charge $Q_{REF}$ and the switching frequency associated with the activation/deactivation of the switch 56. Furthermore, while the magnitude of the charge reference $Q_{REF}$ is described as being static, it is to be understood that the magnitude of the electric charge reference $Q_{REF}$ can be dynamic, such that it can be adjusted to (e.g., based on a feedback loop or other programming mechanisms) to adjust a regulated output voltage $V_{OUT}$ or an associated output current.

It is to be understood that the transition mode controller 50 is not intended to be limited to the example of FIG. 2. As an example, the switching logic 54 is not limited to the use of the charge comparator 62, the SR-latch 64, and the comparator 66, but could instead include any of a variety of combinational logic, switches, and/or interconnections to alternately activate and deactivate the switch 56 to regulate the output voltage based on the integrating the inductor current $I_{SW}$. Therefore, the transition mode controller 50 can be configured in any of a variety of ways.

Figure 3:
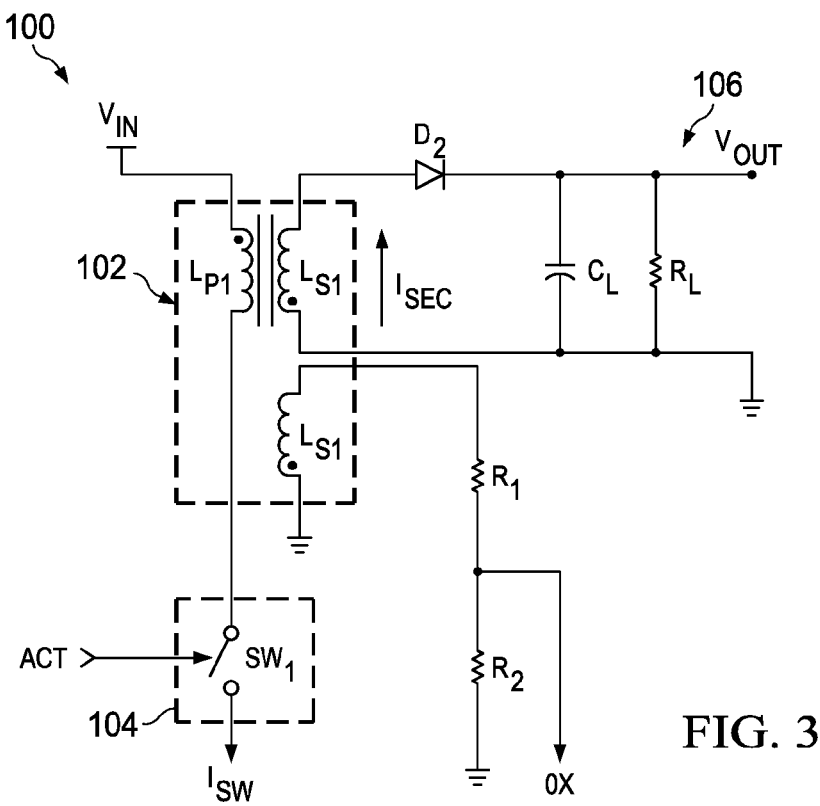
FIG. 3 illustrates an example of a power converter in accordance with an aspect of the invention.

FIG. 3 illustrates an example of a switching converter 100 in accordance with an aspect of the invention. The switching converter 100 can correspond to the switching converter 12 in the example of FIG. 1, such that the switching converter 100 can be part of the power conversion system 10 in the example of FIG. 1 along with the transition mode controller 18. The switching converter 100 is demonstrated in the example of FIG. 3 as a flyback converter. It is to be understood that the switching converter 100 is demonstrated as one example of a configuration of a flyback converter, and that other configurations of flyback converters are possible for use in the power conversion system 10 in the example of FIG. 1.

The switching converter 100 includes a transformer 102. The transformer 102 includes a primary winding $L_{P1}$ and a secondary winding $L_{S1}$. The magnetizing inductance of the primary winding $L_{P1}$ can correspond to the inductor 16 in the example of FIG. 1. The switching converter 100 also includes a switch 104, demonstrated as $SW_1$ in the example of FIG. 3, which can thus correspond to the switch 14 in the example of FIG. 1 and the switch 56 in the example of FIG. 2. Thus, in response to the activation signal ACT, the switch 104 is activated to provide inductor current to flow through the primary winding $L_{P1}$ from the input voltage $V_{IN}$. During activation of the switch 104, the inductor current flows though the switch and to a transition mode controller (e.g., the transition mode controller 18 in the example of FIG. 1 or the transition mode controller 50 in the example of FIG. 2). Furthermore, the switching converter 100 can include a pair of resistors $R_1$ and $R_2$ arranged as a voltage divider that is coupled to a tertiary winding $L_{S2}$ of the transformer 102, and are thus magnetically coupled to the windings $L_{P1}$ and $L_{P2}$. Thus, the pair of resistors $R_1$ and $R_2$ can be configured to derive the zero-crossing signal 0X from the voltage appearing across the tertiary winding $L_{S2}$ to the associated transition mode controller. Accordingly, the associated transition mode controller can control the activation and the deactivation of the switch 104 via the activation signal ACT, such as described above in the example of FIG. 2.

As a further example, the switching converter 100 also includes a diode $D_2$ having an anode coupled to the secondary winding $L_{S1}$ and separating the secondary winding $L_{S1}$ from an output node 106 having the output voltage $V_{OUT}$. The switching converter 100 also includes a load, demonstrated as a resistor $R_L$ in the example of FIG. 3, and an output capacitor $C_L$ coupled in parallel between the output node 106 and ground. In response to the flow of the inductor current $I_{SW}$ through the primary winding $L_{P1}$, magnetic energy is stored in the core of the transformer 102. While the switch 104 is closed, the diode $D_2$ is reverse-biased and the output voltage $V_{OUT}$ is thus maintained by the output capacitor $C_L$ discharging through the load $R_L$.

Upon the opening of the switch 104 via the activation signal ACT, the current transfers from the primary winding $L_{P1}$ to the secondary winding Ls1 and the magnetic energy stored in the core of the transformer 102 discharges through the diode $D_2$ to the capacitor $C_L$ and the load $R_L$. As a result, a current $I_{SEC}$ recharges the output capacitor $C_L$ to maintain the output voltage $V_{OUT}$. Accordingly, the periodic activation of the switch 104 by a respective transition mode controller based on an electric charge associated with the inductor current can be utilized to efficiently regulate the output voltage $V_{OUT}$.

Figure 4:
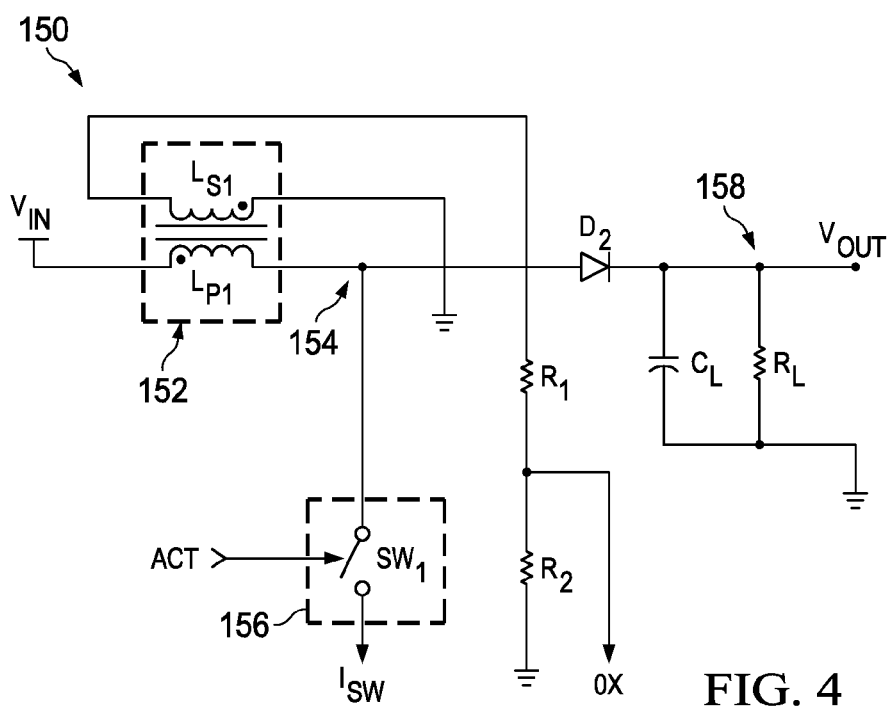
FIG. 4 illustrates another example of a power converter in accordance with an aspect of the invention.

FIG. 4 illustrates another example of a switching converter 150 in accordance with an aspect of the invention. The switching converter 150 can correspond to the switching converter 12 in the example of FIG. 1, such that the switching converter 150 can be part of the power conversion system 10 in the example of FIG. 1 along with the transition mode controller 18. The switching converter 150 is demonstrated in the example of FIG. 4 as a boost converter. It is to be understood that the switching converter 150 is demonstrated as one example of a configuration of a boost converter, and that other configurations of boost converters are possible for use in the power conversion system 10 in the example of FIG. 1.

The switching converter 150 includes an inductor 152 that interconnects the input voltage $V_{IN}$ and a node 154. The inductor 152 includes a primary winding $L_{P1}$ and a secondary winding $L_{S1}$. The magnetizing inductance of the primary winding $L_{P1}$ can correspond to the inductor 16 in the example of FIG. 1. The switching converter 150 also includes a switch 156, demonstrated as $SW_1$ in the example of FIG. 4, which is coupled to a node of the inductor 152 and can thus correspond to the switch 14 in the example of FIG. 1 and the switch 56 in the example of FIG. 2. Thus, in response to the activation signal ACT generated by a transition mode controller (e.g., the transition mode controller 18 in the example of FIG. 1 or the transition mode controller 50 in the example of FIG. 2), the switch 156 is activated to apply the input voltage $V_{IN}$ across inductor 152. Furthermore, the switching converter 150 includes a pair of resistors $R_1$ and $R_2$ arranged as a voltage divider that is coupled to a secondary winding $L_{S2}$ of the transformer 102, and are thus magnetically coupled to the primary winding $L_{P1}$. Since the voltage across secondary winding Ls reverses polarity when the current in the primary winding $L_{P1}$ crosses zero, the voltage divider provides the zero-crossing signal 0X to the associated transition mode controller. Accordingly, the associated transition mode controller can control the activation and the deactivation of the switch 156 via the activation signal ACT, such as described above in the example of FIG. 2.

The switching converter 150 also includes a diode $D_2$ having an anode coupled to the inductor 152 and which separates the primary winding $L_{P1}$ from an output node 158 having the output voltage $V_{OUT}$. The switching converter 150 also includes a load, demonstrated as a resistor $R_L$ in the example of FIG. 4, and an output capacitor $C_L$ coupled in parallel between the output node 158 and ground. In response to the activation of the switch 156, the input voltage $V_{IN}$ is applied across the primary winding $L_{P1}$ and the magnetic energy stored in the primary winding $L_{P1}$ increases. The output voltage $V_{OUT}$ is thus maintained based on the output capacitor $C_L$ discharging through the load $R_L$.

Upon the opening of the switch 156 via the activation signal ACT, the inductor current transfers from the switch 156 to the diode $D_2$, and thus magnetic energy stored in the core of the inductor 152 discharges to the output node 158, recharging the output capacitor $C_L$ and providing current to the load $R_L$ to maintain the output voltage $V_{OUT}$. Accordingly, the activation/deactivation of the switch 156 by a respective transition mode controller based on an electric charge associated with the inductor current $I_{SW}$ can efficiently regulate the output voltage $V_{OUT}$.

Figure 5:
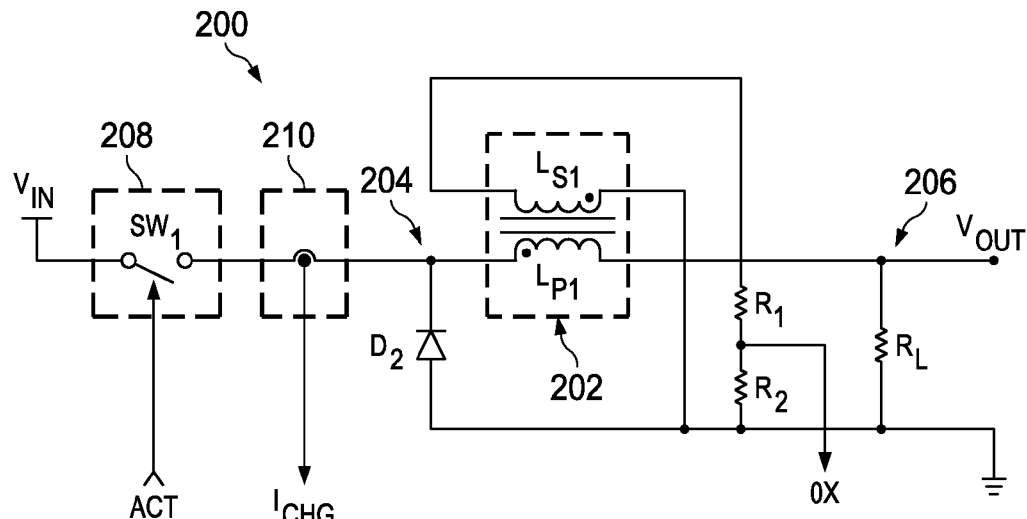
FIG. 5 illustrates yet another example of a power converter in accordance with an aspect of the invention.

FIG. 5 illustrates yet another example of a switching converter 200 in accordance with an aspect of the invention. The switching converter 200 can correspond to the switching converter 12 in the example of FIG. 1, such that the switching converter 200 can be part of the power conversion system 10 in the example of FIG. 1 along with the transition mode controller 18. The switching converter 200 is demonstrated in the example of FIG. 5 as a buck converter. It is to be understood that the switching converter 200 is demonstrated as one example of a configuration of a buck converter, and that other configurations of buck converters are possible for use in the power conversion system 10 in the example of FIG. 1.

The switching converter 200 includes an inductor 202 that interconnects a node 204 and an output node 206. The inductor 202 includes a primary winding $L_{P1}$ and a secondary winding $L_{S1}$. The magnetizing inductance of the primary winding $L_{P1}$ can correspond to the inductor 16 in the example of FIG. 1. The switching converter 200 also includes a switch 208, demonstrated as $SW_1$ in the example of FIG. 5, which is coupled to the input voltage $V_{IN}$ and can thus correspond to the switch 14 in the example of FIG. 1 and the switch 56 in the example of FIG. 2. Furthermore, the switching converter 200 can include a current sense element 210, such as the current sense element 58 in the integrator 52 of the example of FIG. 2, which is arranged in series between the switch 208 and the output node 206. The current sense element 210 thus provides the current $I_{CHG}$ which is proportional to the current through the switch 208. The switching converter 200 also includes a diode $D_2$ having a cathode coupled to the node 204 and which separates the node 204 from ground. The switching converter 200 further includes a load and a filter capacitor, demonstrated as a resistor $R_L$ and a capacitor $C_L$, respectively, in the example of FIG. 5, coupled between the output node 206 and ground.

Thus, in response to the activation signal ACT, the switch 208 is activated and current begins flowing in the primary winding $L_{P1}$ from the input voltage $V_{IN}$. Thus, the current signal $I_{CHG}$ increases accordingly. The current through the primary winding $L_{P1}$ recharges the output capacitor $C_L$ and provides current flow through the load $R_L$ to maintain the output voltage $V_{OUT}$. Upon the opening of the switch 208 via the activation signal ACT, the magnetic energy that is stored in the primary winding $L_{P1}$ begins to discharge. The current through the primary winding $L_{P1}$ continues to flow into the capacitor $C_L$ and the load $R_L$, thus maintaining the output voltage $V_{OUT}$.

In the example of FIG. 5, the current $I_{CHG}$ can be provided to a transition mode controller (e.g., the transition mode controller 18 in the example of FIG. 1 or the transition mode controller 50 in the example of FIG. 2). Furthermore, the switching controller 200 includes a pair of resistors $R_1$ and $R_2$ that are magnetically coupled to the primary winding $L_{P1}$ via a secondary winding $L_{S1}$ and are arranged as a voltage divider. Thus, the pair of resistors $R_1$ and $R_2$ can be configured to provide the zero-crossing signal 0X as a voltage associated with the inductor current and provided the associated transition mode controller that reverses when the inductor current crosses zero. Accordingly, the associated transition mode controller can control the activation and the deactivation of the switch 208 via the activation signal ACT, such as described above in the example of FIG. 2. As a result, the activation/deactivation of the switch 208 by a respective transition mode controller based on an electric charge associated with the inductor current $I_{SW}$ can efficiently regulate the output voltage $V_{OUT}$.

Figure 6:
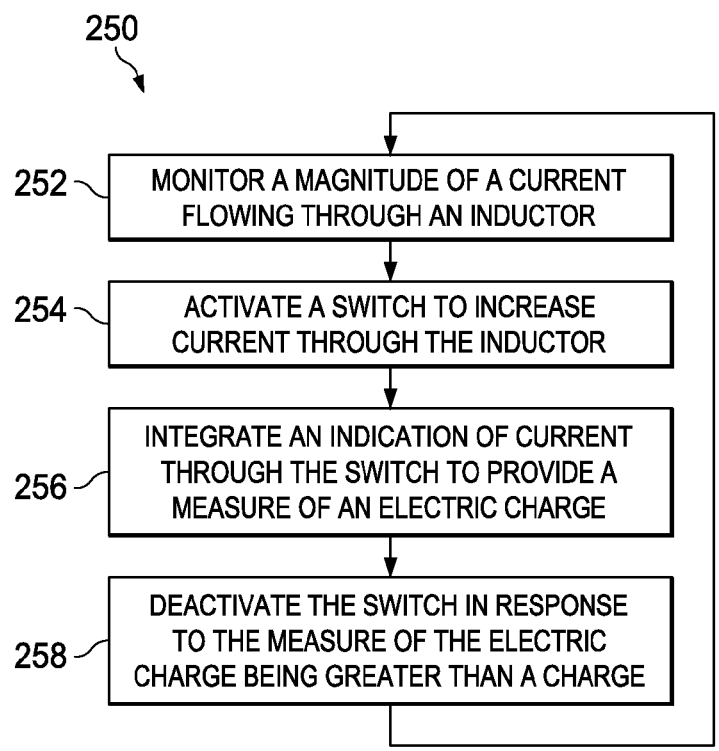
FIG. 6 illustrates an example of a method for regulating an output voltage in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 250 for regulating an output voltage in accordance with an aspect of the invention. The output voltage can be provided from a power conversion system, such as including a flyback, buck, or boost switching converter. At 252, the magnitude of the flux in an inductor is monitored. The monitoring of the flux can be accomplished by sensing the current in an inductor winding by using a current sense element of appropriate gain or by monitoring the voltage across an inductor winding. At 254, a switch is activated to cause current to flow through the inductor in response to the magnitude of the flux being approximately zero. The determination of inductor flux crossing zero can be made by a comparator that detects when the current in the inductor crosses zero or a comparator that detects when the voltage across a winding of the inductor reverses polarity, thus setting a latch that activates the switch.

At 256, an indication of current through the switch is integrated to provide a measure of an electric charge. A signal proportional to the electric charge can be generated by charging a capacitor with the signal indicative of the inductor current, the voltage developing across a capacitor representing a measure of the charge absorbed from the input voltage source through the switch. At 258, the switch is deactivated in response to the measure of the electric charge being greater than a charge reference, which can be fixed or be variable. Following the deactivation of the switch, the integrating circuit is reset to zero in preparation for the next cycle where the method returns to 252 to repeat. In this way, the activation/deactivation cycle repeats to modulate the switch to efficiently regulate the output voltage.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power converter system comprising:
a converter configured to convert an input voltage to an output voltage, the converter comprising at least one switch that is controlled in response to an activation signal to provide current through an inductor; and
a transition mode controller comprising switching logic and operating at the boundary between a continuous conduction mode and a discontinuous conduction mode configured to provide the activation signal based on a measure of charge derived from current through the switch and based on the current through the inductor, wherein the switching logic is further configured to activate the switch in response to the magnitude of the current through or the magnetic flux in the inductor being approximately zero, wherein the transition mode controller comprises:
an integrator configured to integrate the current through the switch to derive the measure of accumulated charge absorbed from an input wherein the charge absorbed per cycle is related to a reference; and
switching logic configured to deactivate the switch in response to the measure of charge being greater than a charge reference,
and wherein the converter self-oscillates.

2. The system of claim 1, wherein the switching logic comprises:
a first comparator configured to detect a zero-crossing condition for the current through or the flux in the inductor;
a charge comparator configured to compare the measure of charge with the charge reference; and
a latch configured to activate the switch in response to detecting the zero-crossing condition and to deactivate the switch in response to the measure of charge being greater than the charge reference.

3. The system of claim 2, wherein the predetermined charge reference comprises a variable reference.

4. The system of claim 1, wherein the integrator comprises:
a capacitor configured to be charged in response to the flow of the current through the switch; and
a reset switch that is activated to discharge the capacitor substantially concurrently with the deactivation of the switch for resetting the integrator for a next control cycle.

5. The system of claim 1, wherein the switching converter is configured as a flyback converter comprising a transformer, the inductor being configured as a primary inductance associated with the transformer.

6. The system of claim 1, wherein the switching converter is configured as a buck converter.

7. The system of claim 1, wherein the switching converter is configured as a boost converter.

8. A method for regulating an output voltage, the method comprising:
monitoring a magnitude of a current flowing through an inductor of a converter;
activating a switch with a transition mode controller operating at the boundary between a continuous conduction mode and a discontinuous conduction mode to increase the magnitude of the current in response to the magnitude of the current through the inductor being approximately zero;
integrating an indication of current through the switch to derive a measure of an electric charge absorbed from an input voltage during activation of the switch wherein the accumulated charge absorbed per cycle is related to a reference; and
deactivating the switch in response to the measure of the electric charge being greater than a charge reference, wherein the converter self-oscillates.

9. The method of claim 8, wherein integrating the current comprises charging a capacitor in response to the current flowing through the switch, the method further comprising comparing voltage across the capacitor to a voltage representing the charge reference to determine if the electric charge absorbed exceeds the charge reference.

10. The method of claim 9, further comprising discharging the capacitor substantially concurrently with deactivating the switch to reset the integrating.

11. The method of claim 9, further comprising resetting a latch based on the electric charge absorbed exceeding the charge reference such that the switch is deactivated.

12. The method of claim 8, wherein monitoring the magnitude of the current flowing through the inductor comprises comparing a magnitude of a voltage appearing on a winding of the inductor with a reference to determine a zero crossing condition for the current through the inductor.

13. The method of claim 12, wherein activating the switch occurs in response to setting a latch to activate the switch based on to the magnitude of the voltage being approximately equal to zero to indicate the zero crossing condition for the current through the inductor.

14. The method of claim 8, wherein monitoring the magnitude of the current comprises monitoring the magnitude of the current flowing through a primary inductance of a transformer in a flyback switching converter.

15. A power converter system comprising:
a switching converter configured to generate an output voltage based on activation and deactivation of a switch to provide a current through an inductor; and
a transition mode controller operating at the boundary between a continuous conduction mode and a discontinuous conduction mode comprising:
an integrator configured to integrate a representation of the current through the switch to provide a measure of an electric charge absorbed from an input voltage of the converter wherein the accumulated charge absorbed per cycle is related to a reference; and
switching logic configured to activate the switch in response to a zero-crossing condition of the current through the inductor and to deactivate the switch in response to the measure of electric charge exceeding a charge reference, wherein the converter self-oscillates.

16. The system of claim 15, wherein the switching logic comprises:
a first comparator configured to monitor the zero-crossing condition associated with the current through or flux in the inductor;
a charge comparator configured to compare the measure of electric charge with the predetermined charge reference; and
a latch configured to activate the switch in response to the zero-crossing condition and to deactivate the switch in response to the measure of electric charge being greater than the predetermined charge reference.

17. The system of claim 15, wherein the integrator comprises:
a capacitor configured to be charged in response to the flow of the current through the switch; and a reset switch that is activated to discharge the capacitor substantially concurrently with the deactivation of the switch to reset the integrator.

18. The system of claim 15, wherein the switching converter is configured as a flyback converter comprising a transformer, the inductor being configured as a primary inductance associated with the transformer.

* * * * *